Patented Aug. 16, 1949

2,478,997

UNITED STATES PATENT OFFICE 2,478,997

CARBALKOXYLATION OF ORGANIC COMPOUNDS

William P. Bitler and Peter Tarsio, Haverstraw, and Leonard Nicholl, Nyack, N. Y., assignors to Kay-Fries Chemicals, Inc., West Haverstraw, N. Y., a corporation of New York No Drawing. Application March 20, 1945, Serial No. 583,838

4 Claims. (Cl. 260—475)

This invention relates to carbalkoxylation of organic compounds and, particularly, to the introduction of carbalkoxy groups into a wide variety of organic compounds.

In the preparation of sodio phenyl malonic esters for use in the preparation of phenyl ethyl barbituric acid, it has been proposed to react phenyl acetic ester with an alkali metal alcoholate and a dialkyl carbonate, in the presence of a great excess of the dialkyl carbonate as the reaction medium and carrier. The use of diethyl carbonate is attended with appreciable difficulty and, when it is used in substantial excess as the reaction medium, these difficulties are greatly increased.

It is intended by means of this procedure to provide a general process for the bringing about of carbalkoxylation of the type indicated which is characterized by good yields and cheap and easily procurable raw materials.

The process apparently can be used wherever carbalkoxylations of the type indicated are wanted. Most such instances seem to comprehend the replacement of an active carbon bonded hydrogen in the organic compound with the carbalkoxylic group and the invention will be so described, although it is not so intended to limit the scope of the invention.

The process of the present invention in addition to providing for the introduction of the carbalkoxyl group usually provides for the introduction of a metallo group into the carbalkoxylated compound. The metal of such group is usually and preferably one of the alkali or alkaline earth metals or aluminum. The product at this stage is a highly reactive metallo compound. The metallo group if it be sodium may be readily replaced by either hydrogen or by an alkyl group by procedures of a known type. Generally speaking, the process of the present invention comprises condensing the compound to be carbalkoxylated with a dialkyl carbonate, in substantially stoichiometrical amounts, in the presence of a metal alcoholate, which may be alcohol free, as a catalyst and metallating agent. This reaction may be represented as follows:

(1) 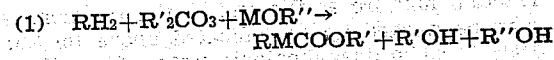

where R is the residue of a compound to be carbalkoxylated, R' is the alkyl of the dialkyl carbonate, M is an alkali metal and R" is the radical of the alcoholate.

(2) 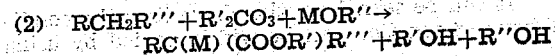

where R is selected from hydrogen and organic residues which do not possess an aliphatic multiply bonded carbon atom adjacent to the CH$_2$ groups, R''' is an organic residue attached to the CH$_2$ group by a carbon atom which is multiply bonded to an atom other than carbon, R' is the alkyl of the dialkyl carbonate, M is an alkali or alkaline earth metal or aluminum, and R'' is the radical of the alcoholate.

The mechanism of the reaction involved has not yet been definitely established. A large excess of the dialkyl carbonate, however, is apparently not necessary as long as a non-aqueous polar reaction medium is provided in which the reactants and the products of the reaction are substantially soluble. It is desirable to distill off the nascent alcohol of the reaction and the alcohol associated with the sodium alcoholate as rapidly as possible during the reaction in those cases where an alcoholic solution of sodium alcoholate is used. Such procedure results in appreciably higher yields.

It has now been found that a dialkyl carbonate can be used as a reagent in the preparation of phenyl alkyl malonic acid alkyl esters, and without difficulty, by using the dialkyl carbonate only in approximately stoichiometrical amounts, and conducting the reaction in an excess of a polar compound as the reaction medium. A suitable compound for this purpose has been found to be dioxane. When dioxane is used as the reaction medium, the reagents are used in approximately equivalent amounts, and the sodium ethoxide is added gradually to the reaction mixture. Under such conditions, no unreacted sodium ethylate is permitted to be present at any time, with the result that there is no cleavage of the phenyl malonic ester or other undesirable side-reactions taking place. With the gradual addition of the ethoxide, the process herein comprehends the rapid removal of any alcohol liberated during the course of the reaction, so that the reaction medium is maintained substantially alcohol-free at all times.

The discovery herein proves that polar compounds can be used as reaction media for a number of special reactions, including those involved in the preparation of the sodio-phenylmalonic esters.

It is, therefore, a feature of novelty of the present application to provide a novel method of conducting chemical reactions, including the use of polar compounds as reaction media or baths.

The novel discovery herein can best be appreciated by reference to actual procedure. In the preparation of sodio-phenylmalonic acid ethyl ester, substantially equivalent weights of diethyl carbonate, and up to approximately 10% excess of diethyl carbonate to allow for diethyl carbonate which comes over with the alcohol and that maintained in the bottom of the column, are reacted in the following manner:

Diethyl carbonate is dissolved in a polar compound, such as dioxane. To this mixture, or solution, ethyl phenyl acetate and sodium ethylate are gradually added. Any alcohol formed is constantly removed. The quantities of reagents used are 118 grams of diethyl carbonate (1 mol); 164 grams of ethyl phenyl acetate (1 mol); 331 grams of sodium ethylate solution (6.96% sodium=23.9 Na—1 atom); and 455 grams dioxane.

The above reaction was carried out by adding sodium ethylate solution and the ethyl phenyl acetate, in substantially equivalent amounts, to the solution of diethyl carbonate in dioxane. The reaction was conducted over a period of four hours, the reaction vessel or a flask having a fractionating column. Dioxane was maintained in the bottom of the column, and the alcohol present or formed was continuously distilled off. The temperature at the bottom of the column was 100°. The temperature of the reaction mixture, at the beginning, was 100°, and 125° at the end of the reaction. The vapor temperature was 78°. A certain amount of the dioxane, approximately a quarter of the total amount, and some of the diethyl carbonate, are entrained with the alcohol. After all the sodium ethylate solution has been added, the distillation is continued until dioxane begins to come over at the top of the column. The phenyl malonic ester is now obtained as the sodium salt, largely in solution in dioxane.

If desired, the sodio salt may be alkylated by reaction with ethyl bromide or ethyl chloride in known manner, without isolation of the phenyl malonic ester to obtain phenyl ethyl malonic ester.

In order to estimate the yield of the sodio phenyl malonic ester, the mixture of the sodio salt product in dioxane may be acidified by adding a slight excess of acetic acid mixed with ice. The oil layer is separated and the water layer extracted once with ether and added to the oil layer. The combined product layers are then fractionated, when there is obtained a dioxane fraction along with a little water, an intermediate cut of 50 g. containing 70% (or 35 g.) phenyl malonic ester and 30% (or 15 g.) of ethyl phenyl acetate and a main cut of 154 g., which is 100% pure phenyl malonic ester. Thus, the total weight of the phenyl malonic ester recovered is 189 g., which corresponds to a yield of 88% and a conversion of 80%, based on the original amount of ethyl phenyl acetate used.

In the second experiment, phenylmalonic acid ethyl ester was prepared in a slightly different manner. In this procedure, substantially equivalent weights of ethyl phenyl acetate and diethyl carbonate are again reacted in dioxane. The diethyl carbonate is first dissolved in the sodium ethylate solution and this solution is added to ethyl phenyl acetate dissolved in dioxane. Reaction conditions are maintained as before, namely, the alcohol is removed as rapidly as possible from the reaction mixture. In this case, one mol of ethyl phenyl acetate, 164 grams, and 374 grams of sodium ethylate (6.52% sodium —24.4 grams Na 1 atom+6% excess) reacts with 118 grams of diethyl carbonate (1 mol) dissolved in 450 grams of dioxane, to make 236 grams of phenylmalonic ester according to theory.

The reaction was carried out in four hours and under the same conditions as in the first experiment, dioxane being maintained in the lower part of the column and the sodium ethylate and diethyl carbonate mixture added gradually. If it is desired to determine the yield of phenylmalonic ester, the sodio phenylmalonic acid ethyl ester may be acidified and the free phenylmalonic ester recovered as described above. There is obtained on distillation of the crude reaction mixture a first fraction of dioxane and some water, an intermediate fraction of 52.2 g. containing 58%, or 30.2 g., of phenylmalonic ester, and 42%, or 22 g., of ethyl phenyl acetate, plus a main fraction of 138 g. of 100%-pure phenylmalonic ester. The total amount of phenylmalonic ester obtained is 30.2 g.+138 g. or 168 g., which corresponds to a yield of 83%, and a conversion of 71%, based on the original amount of ethyl phenyl acetate.

As a further indication of the general applicability of the reaction, another example is given. This time, the ethyl phenyl acetate and diethyl carbonate are dissolved in dioxane and an alcoholic solution of sodium ethylate slowly added to the reaction mixture. Thus, 118 g. diethyl carbonate (1 mol), and 164 g. ethyl phenyl acetate (1 mol), are dissolved in 455 g. of dioxane. There is added gradually 374 g. of alcoholic sodium ethylate containing 6.52% sodium. As indicated in the previous experiment, dioxane is kept refluxing in the bottom of the column (reaction mixture temperature 105-107°; temperature at bottom of column 98-108°) and care is taken to continually distill out promptly through the column the nascent alcohol of reaction and the alcohol from the sodium ethylate solution. After the sodium ethylate solution has all been added, distillation is continued until dioxane appears in the top of the column. The reaction mixture is then cooled and worked up for yield as indicated in the previous examples. There was obtained 20 g. of intermediate fraction containing 75% (or 15 g.) of ethyl phenyl acetate, 25% (or 5 g.) of phenylmalonic ester, and a main fraction of 177 g. of pure phenylmalonic ester. This would make a total of 182 g., which corresponds to a yield of 86% and conversion of 77%. Still another example is as follows: This time, the diethyl carbonate, the ethyl phenyl acetate, and the sodium ethylate solution are mixed, and then added to the refluxing dioxane. Thus, 369 g. ethyl phenyl acetate (2.25 mols), 265.5 g. diethyl carbonate (2.25 mols), and 815 g. sodium ethylate solution containing 6.73% sodium, are mixed, and then added gradually to 1014 g. of dioxane, which is kept refluxing in a two-liter flask set up under an efficient fractionating column, as in the previous experiments. Care is taken that the nascent alcohol of reaction, and the alcohol from the sodium ethylate are driven from the reaction mixture as rapidly as possible. When all the alcohol has been driven from the reaction mixture at the end of the reaction, it may be worked up as indicated above for the yield of sodio phenylmalonic ester. Thus, there was obtained 447.0 g. of phenylmalonic ester, which indicated a yield and conversion of 88.4%, based on the original amount of ethyl phenyl acetate used.

It will be seen from the above that the conditions of reaction can be widely varied by using the non-aqueous polar compound dioxane, or equivalent non-aqueous compounds, which serve as solvents for the several reagents, and do not enter into the reaction themselves. Thus, the reaction can be carried out with good yields, using substantially equivalent amounts of diethyl carbonate and ethyl phenyl acetate, or a slight excess of either one, and adding the sodium ethylate in a number of different ways. A wide variety of procedures, as described above, may be used to bring the reagents together. It is of prime importance to carry out the reaction in an excess of dioxane, or other suitable non-aqueous polar solvent in which the reagents are largely soluble, as well as to add the sodium ethylate gradually, and to make provision to remove the alcohol of reaction and the alcohol derived from the sodium ethylate promptly, and to avoid any momentary excess of sodium ethylate.

These reactions could also be carried out in other solvents similar to dioxane, say, for example, dimethyl dioxane or any solvent in which sodium ethylate and the sodium salt of phenylmalonic ethyl ester are soluble. Alcohol-free sodium ethylate could also be used if it were added gradually to the reaction mixture. Thus, by maintaining the general relationship of substantially equivalent amounts or weights of diethyl carbonate and ethyl phenyl acetate in the reaction mixture, including the excess of dioxane, the reaction condition can be varied widely and without involving any sacrifice in yield of the desired product.

To recapitulate, the following conditions appear necessary in order to assure a good yield of phenylmalonic ester:

1. Only a minimum amount of alcohol should be permitted in a reaction mixture, and this only for a very short time. This condition may be assured by maintaining some of the solvent refluxing in the bottom of the column to insure that the alcohol is removed from the reaction mixture as rapidly as possible. Sodium ethylate is added slowly so that the alcohol of reaction does not come off separately from the alcohol derived from the sodium ethylate.

2. There must be no momentary excess of sodium ethylate during the reaction. Sodium ethylate must be added at a constant rate governed by the speed with which it reacts.

3. When the above conditions are met, the large excess of diethyl carbonate required by the prior art does not appear to be necessary. This is proved by the use of the dioxane in which all the reactants are quite soluble. The reaction, as noted, can be carried out with only substantially equivalent amounts of the two reactants, and no large excess of either one.

4. It is to be noted that, in the second experiment, there is what amounts to a preponderant excess of ethyl phenyl acetate during the greater part of the course of the reaction. This is by reason of the fact that the diethyl carbonate is gradually added to the ethyl phenyl acetate.

It will be seen from the above that, among the advantages of conducting the reaction in the manner disclosed, are the elimination of the necessity of using a large excess of diethyl carbonate and the substitution of a cheaper solvent (dioxane) for such excess diethyl carbonate. Further, the novel processes herein permit the use of sodium alcoholate dissolved in alcohol, which is definitely contrary to the requirements of the teachings of the prior art.

The ability to use the alcoholic sodium ethoxide or sodium alkoxide is a distinct advantage in that it permits the preparation of the ethoxide in an excess of the alcohol, and the direct use of the alkoxide solution so formed. Another advantage would be that, in the case of dioxane, it is possible to carry the reaction out at a lower temperature, 105–107°, under normal pressure than is the case if a large excess of diethyl carbonate is used (126–128°).

What is claimed is:

1. The process for the carbalkoxylation of a phenylacetic ester which comprises establishing a reaction bath of a phenylacetic ester in an excess of dioxane as the reaction medium and common solvent, adding diethyl carbonate gradually to the bath and in equivalent units, adding an alkalimetal alcoholate gradually to the reaction bath under controlled conditions such that no excess of the alcoholate is ever present in the bath, whereby side reactions with the alcoholate are prevented, and continuously removing alcohol liberated in the process from the reaction mixture in an excess of dioxane vapor, whereby no alcohol is ever retained in the bath; and separating the ester from the residual dioxane.

2. Process according to claim 1, characterized by the fact that alkali metal alcoholate is an alcoholic metal alcoholate, and the rate of addition is such that the alcohol liberated in the reaction is removed simultaneously with the alcohol derived from the alcoholate.

3. The process of making sodio-phenylmalonic esters which comprises establishing a reaction bath of a phenylacetic ester in an excess of dioxane as the reaction medium and common solvent, adding diethyl carbonate gradually to the bath and in equivalent units, adding sodium alcoholate gradually to the reaction bath under controlled conditions such that no excess of the sodium alcoholate is ever present in the bath, whereby side reactions with the alcoholate are prevented, continuously removing alcohol liberated in the process from the reaction mixture in an excess of dioxane vapor, whereby no alcohol is ever retained in the bath, and separating the resulting esters from the dioxane bath.

4. Process as set forth in claim 3, in which the alcoholate is alcoholic sodium ethylate, and the rate of addition is such that the ethyl alcohol liberated in the reaction is removed simultaneously with the alcohol derived from the alcoholate.

WILLIAM P. BITLER.
PETER TARSIO.
LEONARD NICHOLL.

REFERENCES CITED

The following references are of record in the file of this patent:

UNITED STATES PATENTS

| Number | Name | Date |
|---|---|---|
| 2,346,059 | Wallingford et al. | Apr. 4, 1944 |
| 2,367,632 | Wallingford et al. | Jan. 16, 1945 |
| 2,376,837 | Wallingford et al. | May 22, 1945 |

FOREIGN PATENTS

| Number | Country | Date |
|---|---|---|
| 559,306 | Great Britain | Feb. 14, 1944 |

OTHER REFERENCES

"Synthetic Organic Chemicals," Carbide and Carbon Chemical Corporation (1940), page 23.

Lux, "Eine neue Synthesi des Acetessigesters," Jahrg 62 (1929), 1824–1827.